(12) United States Patent
Wavde et al.

(10) Patent No.: US 8,746,763 B2
(45) Date of Patent: Jun. 10, 2014

(54) MULTISTAGE ENERGY ABSORBER DEVICE AND METHOD OF FORMING SAME

(75) Inventors: Amit A. Wavde, Sterling Heights, MI (US); Brian D. Van Buren, Shelby Township, MI (US); Trevor T. Winch, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/474,907

(22) Filed: May 18, 2012

(65) Prior Publication Data

US 2013/0307288 A1    Nov. 21, 2013

(51) Int. Cl.
*B60R 19/34* (2006.01)

(52) U.S. Cl.
USPC ............................................ 293/133; 293/155

(58) Field of Classification Search
USPC ................ 293/133, 155; 296/187.05, 187.03, 296/187.09; 188/371, 376, 377
See application file for complete search history.

(56) References Cited

U.S. PATENT DOCUMENTS

| | | | | |
|---|---|---|---|---|
| 3,428,150 | A | * | 2/1969 | Muspratt et al. .............. 188/375 |
| 5,324,133 | A | * | 6/1994 | Kreis et al. .................... 403/270 |
| 6,942,262 | B2 | | 9/2005 | Glasgow et al. |
| 2007/0261592 | A1 | * | 11/2007 | Mochida et al. ........... 105/392.5 |
| 2011/0278868 | A1 | | 11/2011 | Wavde et al. |

* cited by examiner

*Primary Examiner* — Dennis H Pedder
*Assistant Examiner* — Beverly Becker
(74) *Attorney, Agent, or Firm* — Quinn Law Group, PLLC

(57) ABSTRACT

A multistage energy absorber device is provided that includes at least two generally tubular members. Each of the generally tubular members has a first end and a second end. The second generally tubular member is independent of the first generally tubular member and fits within the first generally tubular member. The first ends of the generally tubular members are substantially flush with each other, but the second end of the second generally tubular member protrudes sufficiently beyond the second end of the first generally tubular member to form a first deformation stage. The first and second generally tubular members extend coextensively sufficiently from the first ends of the first and second generally tubular members to the second end of the first generally tubular member to form a second deformation stage.

17 Claims, 5 Drawing Sheets

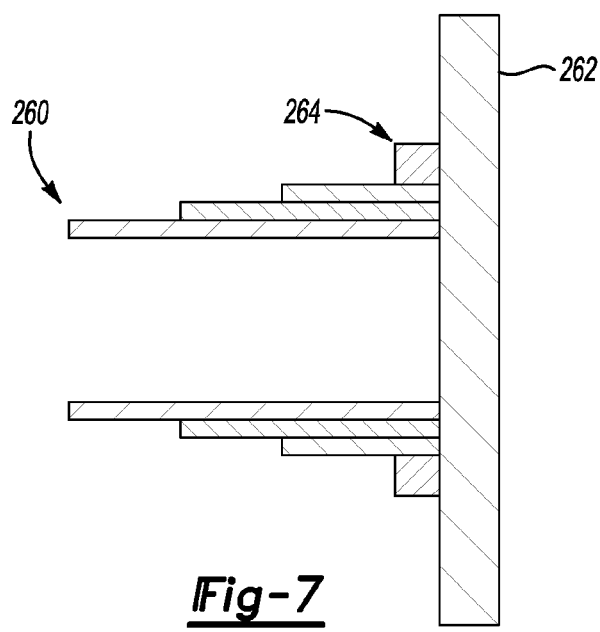
_Fig-7_
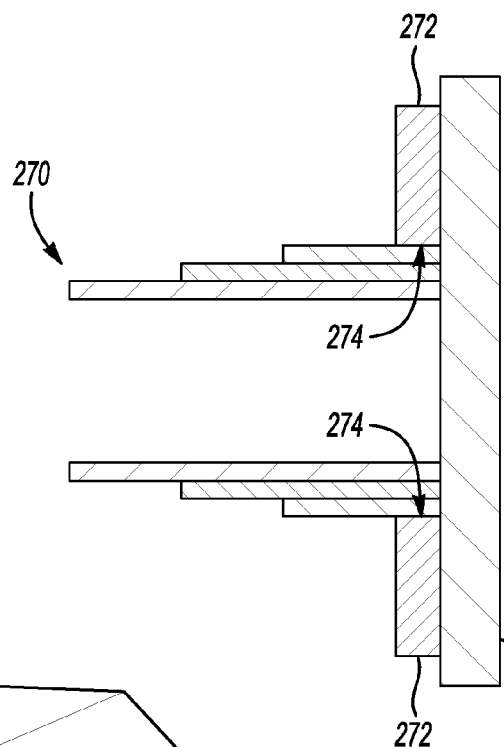
_Fig-8_
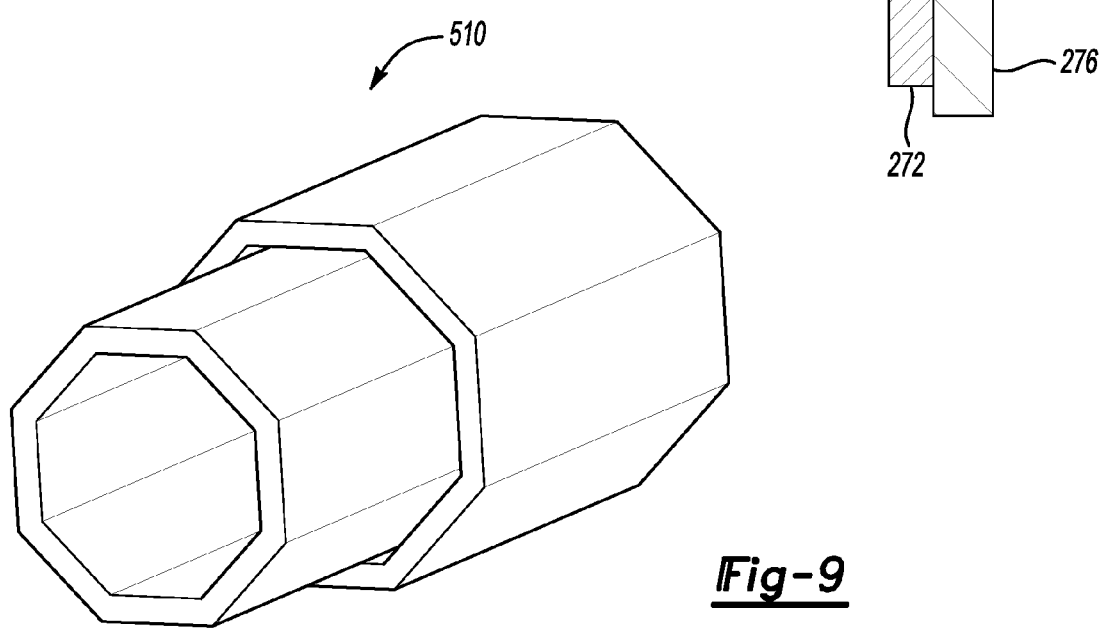
_Fig-9_

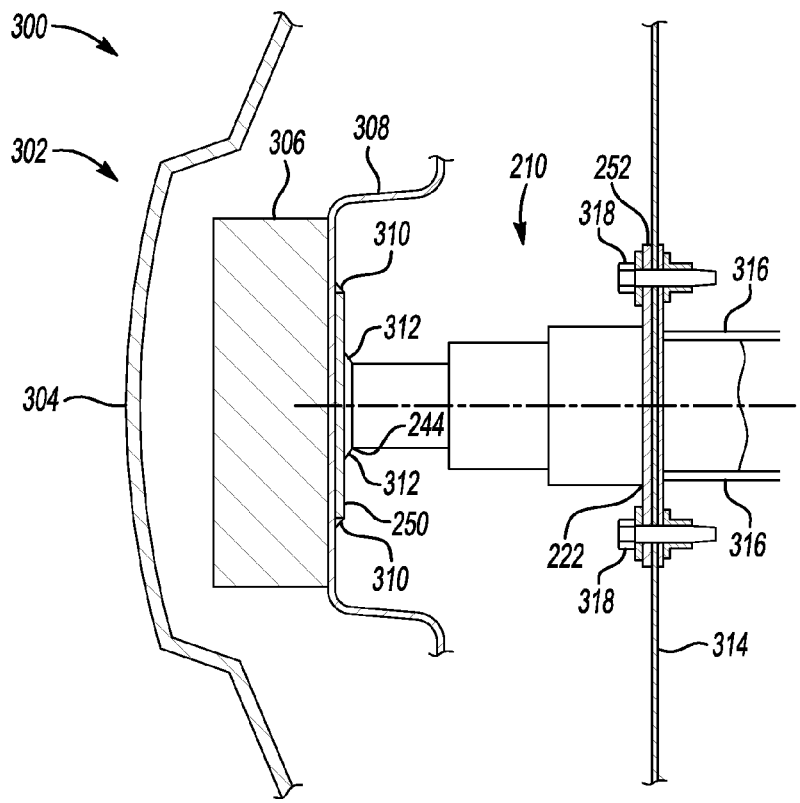
Fig-10
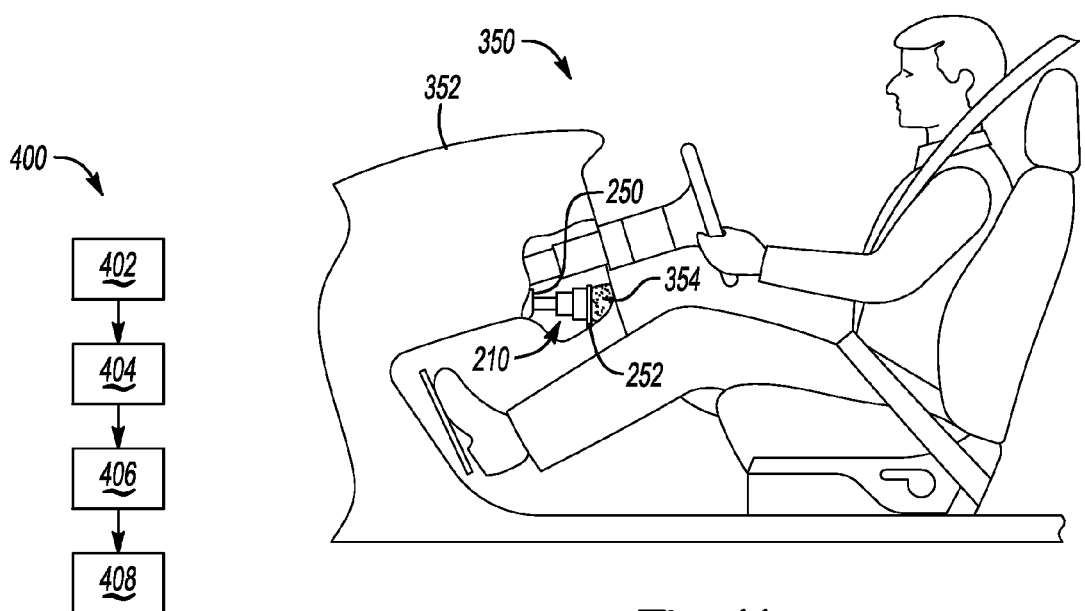
Fig-12
Fig-11

US 8,746,763 B2

MULTISTAGE ENERGY ABSORBER DEVICE AND METHOD OF FORMING SAME

TECHNICAL FIELD

The invention relates to a multistage energy absorber device, such as an energy absorber device for a vehicle, and a method of forming the device.

BACKGROUND

Automotive vehicles are typically designed to absorb impact energy using specialized devices in the event of an impact. For example, the vehicle frame rail is designed to absorb a significant amount of energy. Additional energy absorber devices may be used to provide localized areas of energy absorption in order to prevent or limit deformation of surrounding components. These energy absorber devices may be complex in design or may not be readily scalable for multiple applications.

SUMMARY

A multistage energy absorber device is provided that includes at least two generally tubular members. Each of the generally tubular members has a first end and a second end. The second generally tubular member is independent of the first generally tubular member and fits within the first generally tubular member. The first ends of the generally tubular members are substantially flush with each other, but the second end of the second generally tubular member protrudes sufficiently beyond the second end of the first generally tubular member to form a first deformation stage. The first and second generally tubular members extend coextensively sufficiently from the first ends of the first and second generally tubular members to the second end of the first tubular member to form a second deformation stage.

In a second embodiment, a third generally tubular member is included with the first and second generally tubular members to provide a third deformation stage.

The multistage energy absorber device may be used in a vehicle installed between vehicle components. For example, the multistage energy absorber device may be installed between a vehicle bumper and a frame rail, or between an instrument panel and a knee bolster component.

A method of forming the multistage energy absorber device includes forming a first generally tubular member and a second generally tubular member which fits within the first generally tubular member. Forming the generally tubular members may be by seamless welding, extrusion, or roll forming with seam welding, but is not limited to such processes. Additional generally tubular members may be formed as desired. The method also includes positioning the first ends of each of the first and second generally tubular members substantially flush with each other so that the second end of the second generally tubular member protrudes sufficiently beyond the second end of the first generally tubular member to form a first deformation stage. The method includes positioning the first generally tubular member and the second generally tubular member so that they extend coextensively sufficiently from the first ends of the first and second generally tubular members to the second end of the first tubular member to form a second deformation stage. The method includes positioning additional generally tubular members to form additional deformation stages as desired. The multistage energy absorber device can be installed between two components attached or operatively positioned at each end of the device.

Because the stages of the multistage energy absorber device can be sized in length, thickness, radius, and shape, the energy absorbing device is readily scalable to fit in required packaging space and absorb desired impact energy while being formed of a few simple parts with less manufacturing complexity than alternate designs. The varying stages additionally provide a variable crush rate device which a typical aluminum extrusion may not provide.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIGS. 7 and 8 are schematic cross-sectional illustrations of alternate embodiments of a second component for attaching to a second end of a multistage energy absorber device;

FIG. 9 is a schematic perspective illustration of another embodiment of the multistage energy absorber device having octagonal shaped generally tubular members;

FIG. 10 is a schematic cross-sectional illustration in partial fragmentary view of a front portion of a vehicle with the device of FIGS. 3 and 4 installed between vehicle components such as a bumper and a frame rail;

FIG. 11 is a schematic side illustration in partial fragmentary view with parts broken away of a portion of a vehicle with the device of FIGS. 3 and 4 installed between vehicle components such as a vehicle instrument panel and a knee bolster; and FIG. 12 is a flow chart showing a method of forming any of the multistage energy absorber devices according to the present invention.

DETAILED DESCRIPTION

Figure 1:
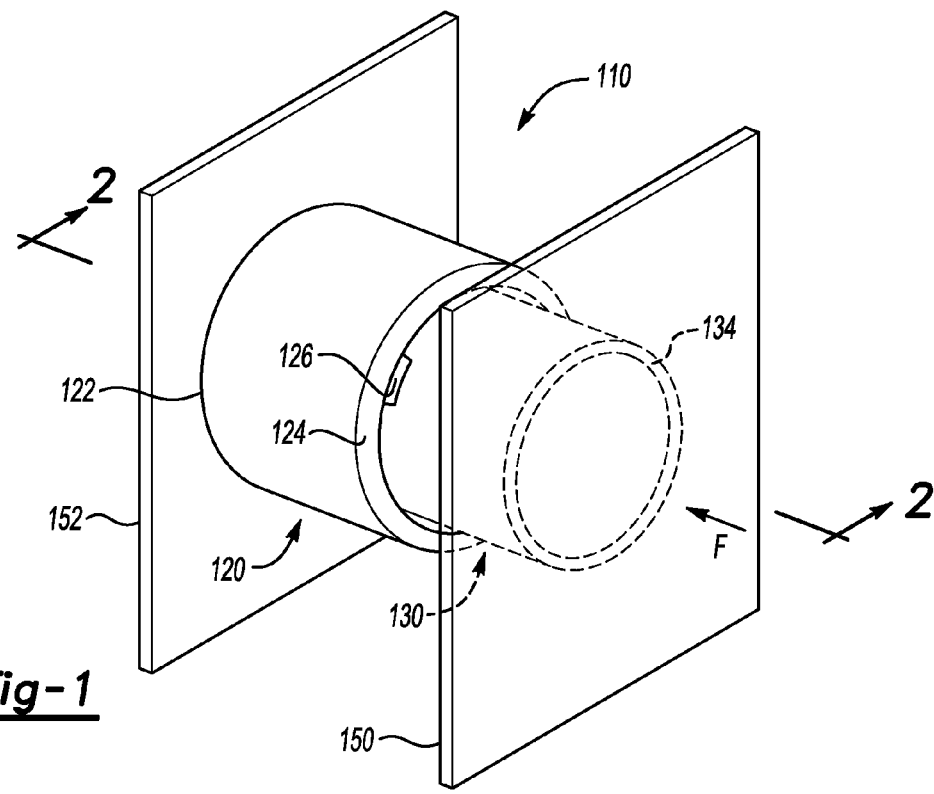
FIG. 1 is a schematic perspective illustration of one embodiment of a multistage energy absorber device.
Figure 2:
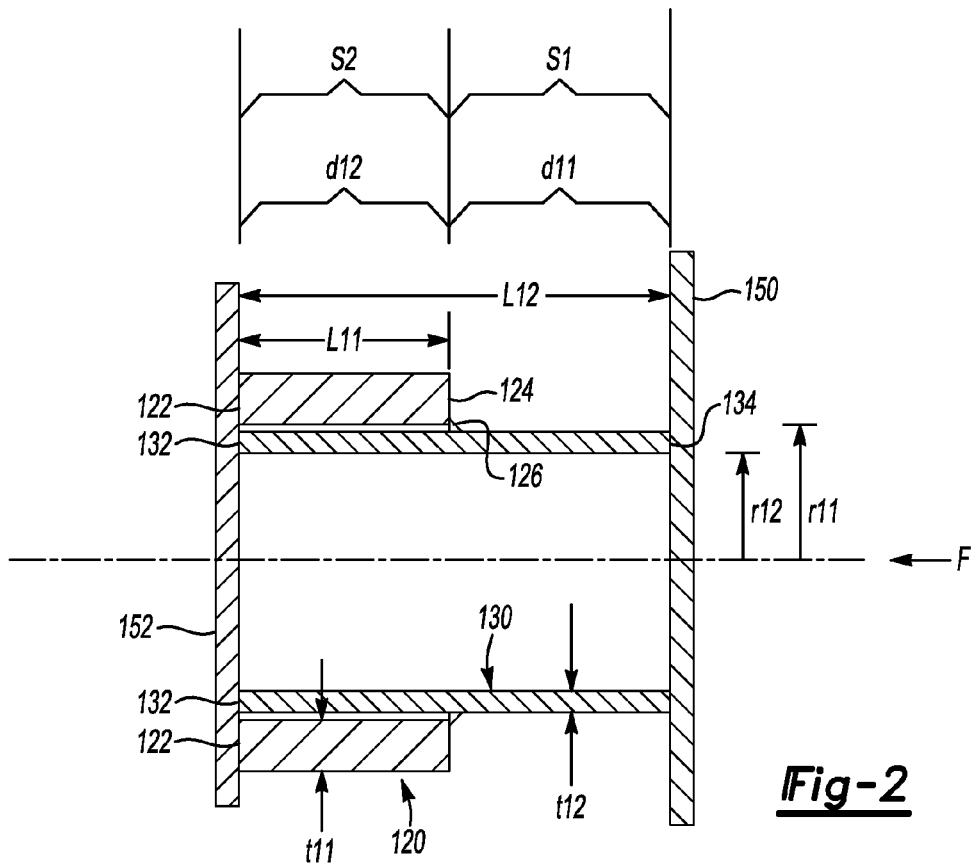
FIG. 2 is a schematic cross-sectional illustration of the device of FIG. 1 taken in the direction of arrows 2-2 of FIG. 1.

Referring to the drawings, wherein like numbers refer to like components throughout the several views, FIG. 1 and FIG. 2 show a multistage energy absorber device 110 configured to control the absorption of impact energy. The multistage energy absorber device 110 includes a first generally tubular member 120 having a first end 122 and a second end 124. The multistage energy absorber device 110 also includes a second generally tubular member 130 which is independent of the first generally tubular member 120. The second generally tubular member 130 fits within the first generally tubular member 120, and the second generally tubular member 130 has a first end 132 (shown in FIG. 2) and a second end 134

(shown in phantom in FIG. 1 and in section in FIG. 2). The first ends 122, 132 of the first and second generally tubular members 120, 130 are substantially flush with each other. The second end 134 of the second generally tubular member 130 protrudes sufficiently beyond the second end 124 of the first generally tubular member 120 to form a first deformation stage S1. Both the first generally tubular member 120 and the second generally tubular member 130 extend coextensively sufficiently from the first ends 122, 132 of the first and second generally tubular members 120, 130 to the second end 124 of the first generally tubular member 120 to form a second deformation stage S2. The term "coextensively" as used herein means that at least one generally tubular member is inside another generally tubular member and those generally tubular members are coaxial for a particular axial length forming a specific deformation stage. The term "sufficiently" as used herein means that the generally tubular members have enough length dimension to form a specific deformation stage. Specific dimensions will be determined by desired design characteristics. The second end 134 of the second generally tubular member 130 may be attached to or positioned operatively adjacent a first component 150. The first ends 122, 132 of the first and second generally tubular members 120, 130 which are substantially flush with each other may be attached to or positioned operatively adjacent a second component 152. A force F may be applied to the first component 150 in a direction toward the second component 152. Although not required, the second end 124 of the first generally tubular member 120 may be secured to the second generally tubular member 130 using a spot weld 126, stitch weld, mechanical clenching, etc., whereby to achieve the deformation characteristics as desired.

As shown in more detail in FIG. 2, the first generally tubular member 120 has a length L11 and a thickness t11. The second generally tubular member 130 has a length L12 and a thickness t12. If the generally tubular members 120 and 130 are cylinders as shown in FIGS. 1 and 2, then the first generally tubular member 120 has a radius r11 which is greater than the radius r12 of the second generally tubular member 130. The dimensions L11, L12, t11, t12, r11 and r12 are selectable to effect the desired deformation rates d11 and d12 for deformation stages S1 and S2 respectively.

Figure 3:
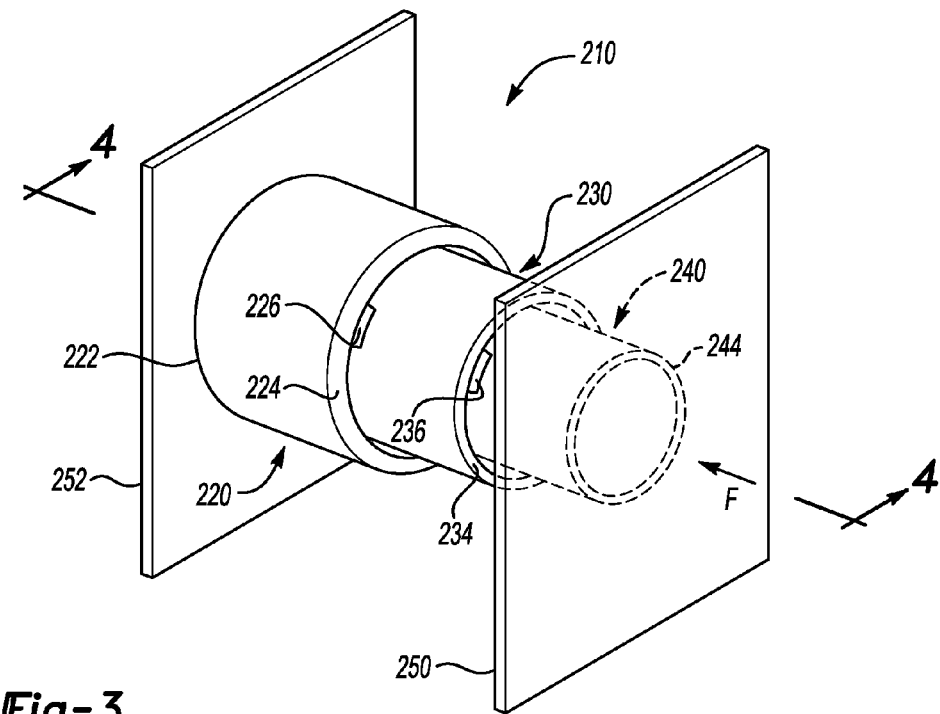
FIG. 3 is a schematic perspective illustration of another embodiment of a multistage energy absorber device.
Figure 4:
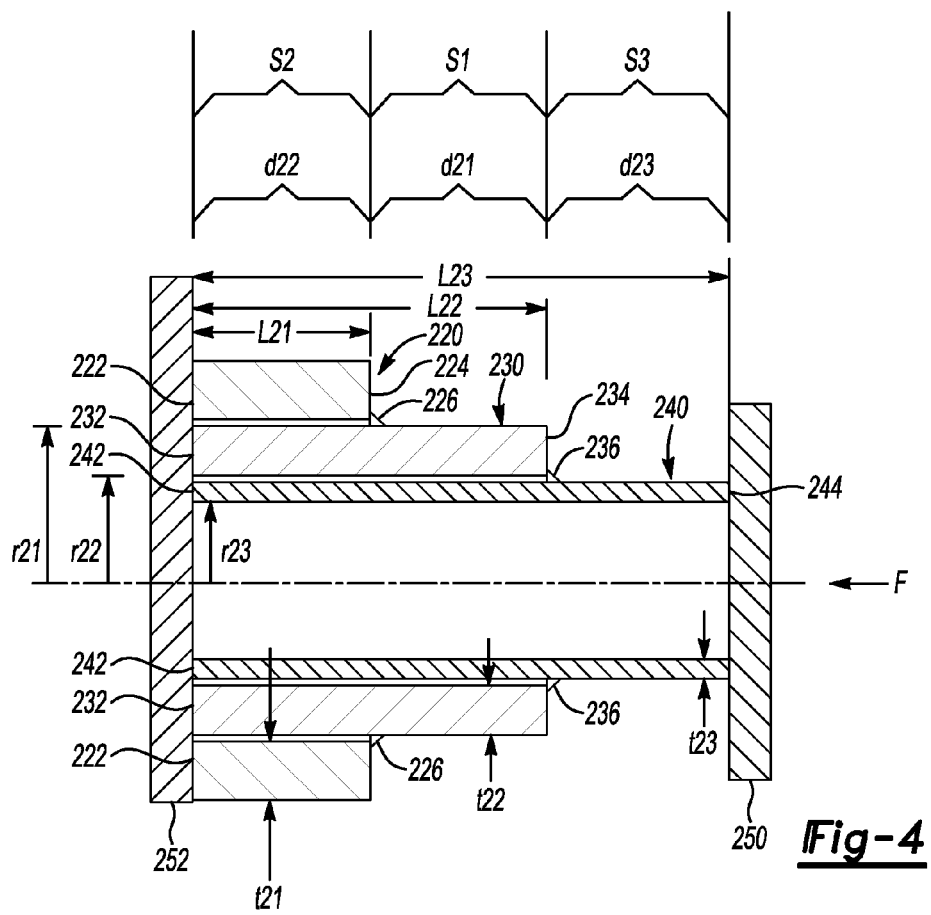
FIG. 4 is a schematic cross-sectional illustration of the device of FIG. 3 taken in the direction of arrows 4-4 of FIG. 3.

Referring to FIG. 3 and FIG. 4, another embodiment of a multistage energy absorber device 210 configured to control the absorption of impact energy is shown. In this embodiment, three deformation stages S1, S2, and S3 are provided. The multistage energy absorber device 210 includes a first generally tubular member 220 having a first end 222 and a second end 224. The multistage energy absorber device 210 also includes a second generally tubular member 230 which is independent of the first generally tubular member 220. The second generally tubular member 230 fits within the first generally tubular member 220, and the second generally tubular member 230 has a first end 232 (shown in FIG. 4) and a second end 234. The multistage energy absorber device 210 also includes a third generally tubular member 240 which is independent of the first and second generally tubular members 220, 230. The third generally tubular member 240 fits within the second generally tubular member 230, and the third generally tubular member 240 has a first end 242 (shown in FIG. 4) and a second end 244 (shown in phantom in FIG. 3 and in section in FIG. 4). The first ends 222, 232, 242 of the first, second and third generally tubular members 220, 230, 240 are substantially flush with each other. The second end 244 of the third generally tubular member 240 protrudes sufficiently beyond the second end 234 of the second generally tubular member 230 to form a third deformation stage S3.

Each of the first generally tubular member 220, the second generally tubular member 230, and the third generally tubular member 240 extend coextensively sufficiently from the first ends 222, 232, 242 of the first, second, and third generally tubular members 220, 230, 240 to the second end 224 of the first generally tubular member 220 to form a second deformation stage S2. The second generally tubular member 230 and the third generally tubular member 240 extend coextensively sufficiently from the first ends 232, 242 of the second and third generally tubular member 230, 240 to the second end 234 of the second generally tubular member to form a first deformation stage S1. The second end 244 of the third generally tubular member 240 may be attached to or positioned operatively adjacent a first component 250. The first ends 222, 232, 242 of the first, second, and third generally tubular members 220, 230, 240 which are substantially flush with each other may be attached to or positioned operatively adjacent a second component 252. A force F may be applied to the first component 250 in a direction toward the second component 252. Although not required, the second ends 224, 234 of the first generally tubular member 220 and of second generally tubular member 230 may be secured to the second generally tubular member 230 and the third generally tubular member 240, respectively, using a spot weld 226, 236; stitch weld; mechanical clenching; etc., whereby to effect the deformation characteristics desired.

As shown in more detail in FIG. 4, the first generally tubular member 220 has a length L21 and a thickness t21. The second generally tubular member 230 has a length L22 and a thickness t22. The third generally tubular member 240 has a length L23 and a thickness t23. If the generally tubular members 220, 230, 240 are cylinders as shown in FIGS. 3 and 4, then the first generally tubular member 220 has a radius r21 which is greater than the radius r22 of the second generally tubular member 230. The radius r22 of the second generally tubular member 230 is in turn greater than the radius r23 of the third generally tubular member 240. As described with respect to FIGS. 1 and 2 previously, the dimensions L21, L22, L23, t21, t22, t23, r21, r22 and r23 are selectable to achieve the desired deformation rates d21, d22, and d23 for deformation stages S1, S2 and S3, respectively.

Figure 5A:
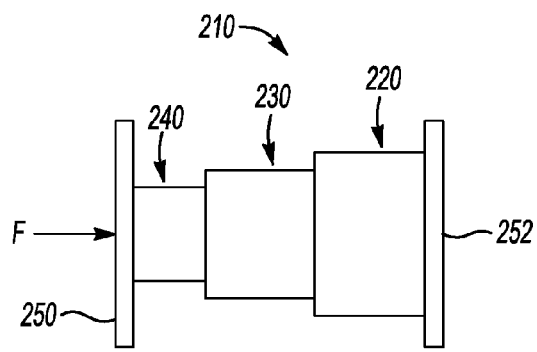
FIGS. 5A-5D are schematic side elevational view illustrations of the device of FIGS. 3 and 4 at various stages of deformation during an impact event.
Figure 5B:
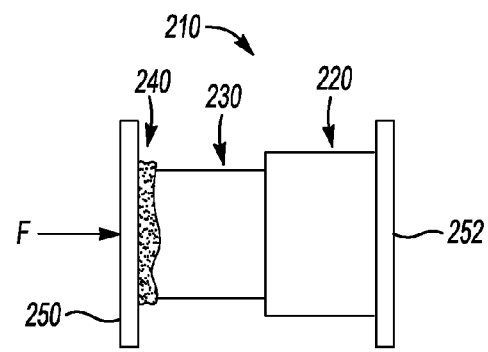
Figure 5C:
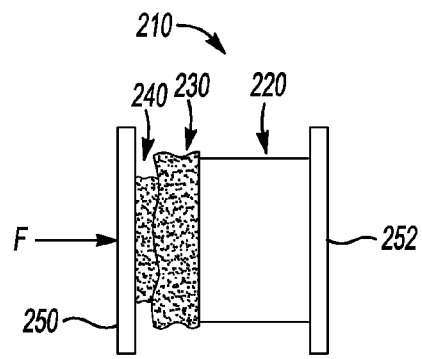
Figure 5D:
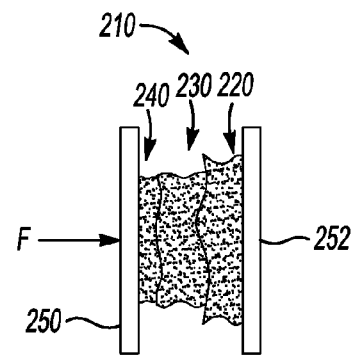

In FIGS. 5A-5D, schematic side view illustrations of the device of FIGS. 3 and 4 at various stages of deformation during an impact event are shown. In FIG. 5A, an impact force F applicable to the first component 250 is applied in a direction toward a second component 252. As shown in FIGS. 5B-5D, as the impact force F is transferred to each deformation stage, each deformation stage has selectable material dimensions (thickness, length, etc. as discussed previously) to effect a desired deformation rate until the impact energy is absorbed or all of the deformation stages have been deformed.

Figure 6:
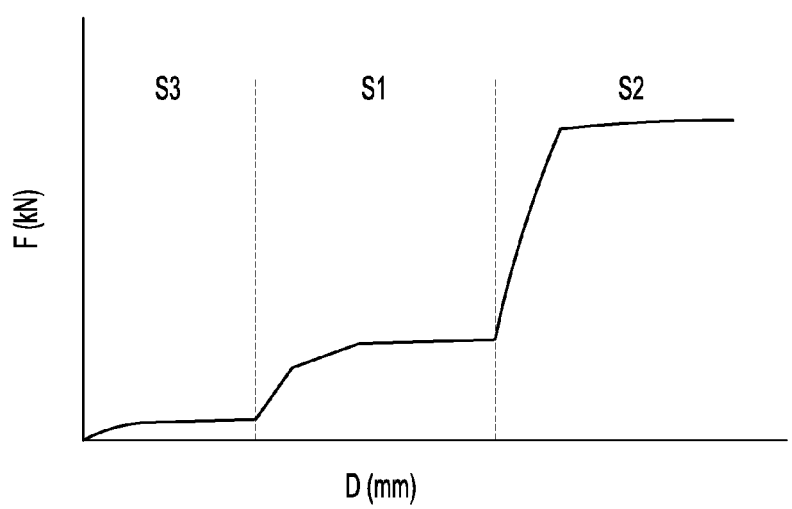
FIG. 6 is a graphical representation of the deformation stages as shown in FIGS. 5A-5D.

FIG. 6 is a graphical representation (Displacement D versus Force F) of the deformation stages as shown in FIGS. 5A-5D. As the third generally tubular member 240 deforms, the deformation rate for deformation stage S3 is shown. Next as the second generally tubular member 230 and the third generally tubular member 240 deform, the deformation rate for deformation stage S1 is shown. The deformation rate for S1 is different than the deformation rate for S3. Similarly as the impact force F continues to be applied to the first component 250, the first, second and third generally tubular members 220, 230 and 240 deform, and the deformation rate for the deformation stage S2 is shown. The deformation rate for deformation stage S2 is different than the deformation rate for S1.

FIGS. 7 and 8 are schematic cross-sectional illustrations of alternate embodiments of a second component (such as a mounting plate) for attaching to a second end of a multistage energy absorber device. In FIG. 7, an embodiment of a second component 262 is shown in which the ends of the multistage energy absorber device 260 are mounted on the second component 262 which has a raised rib or socket 264 into which the generally tubular members fit. The raised rib or socket 264 may be annular, continuous or segmented. In FIG. 8, an embodiment of a second component 272 is shown in which the second component 272 has an opening or aperture 274 sized for receiving the generally tubular members of the multistage energy absorber device 270. The flush ends of the multistage energy absorber device 270 then rest flush against the structural member 276 which the second component 272 is attached to. These alternate embodiments of the second component 262, 272 may allow the multistage energy absorber device 260, 270 to be installed without welding or otherwise permanently attaching the device to the second component 262, 272. Although the above embodiments are shown for the second component 262, 272, one skilled in the art will recognize similar designs may be used with a first component as long as the multistage energy absorber device is securely held to provide desired impact absorption.

FIG. 9 is a schematic illustration of another embodiment of the multistage energy absorber device 510 having octagonal shaped generally tubular members. The multistage energy absorber device may have any polygonal shape as long as desired crush characteristic are achieved.

FIG. 10 shows one application of the multistage energy absorber device 210 in a vehicle 300, installed between first and second vehicle components such as a bumper beam 308 and a frame rail 316. The multistage energy absorber device 210 is used in a bumper assembly 302, which may be a front or rear bumper assembly. The bumper assembly 302 includes a fascia 304 spaced outward of a foam or plastic spacer 306. The spacer 306 is mounted on a bumper beam 308. The first component 250 is welded or otherwise attached to the second end 244 of the multistage energy absorber device 210 at welds 312. The first component 250 may be welded to the bumper beam 308 at weld areas 310. Alternately, the first component 250 may be bolted or otherwise secured to bumper beam 308. The second component 252 is welded or otherwise attached to first end 222 of multistage energy absorber device 210. The second component 252 is bolted to a flange 314 of the vehicle frame rail 316 with bolts 318. Alternately, the second component 252 may be secured to the frame rail 316 by other means instead. By installing the multistage energy absorber device 210 between the bumper beam 308 and the frame rail 316, some of the energy of an impact force transferred through the fascia 304 and foam spacer 306 to the bumper beam 308 is absorbed through deformation of the multistage energy absorber device 210, to control movement of the bumper beam 308 toward the frame rail 316.

FIG. 11 shows another application of the multistage energy absorber device 210 in a vehicle 350, installed between first and second vehicle components such as an instrument panel 352 and a knee bolster component 354. The multistage energy absorber device 210 has a first component 250 at one end mounted to an instrument panel 352. Second component 252 is mounted at the other end of multistage energy absorber device 210 to a knee bolster component 354, such as foam. An impact force applied to the instrument panel 352 in the direction of the multistage energy absorber device 210 will cause the multistage energy absorber device 210 to absorb at least some of the impact energy, with deformation energy being absorbed at varying rates such as shown in FIGS. 5A-5D.

Referring now to FIG. 12, a method 400 of forming a multistage energy absorber device such as multistage energy absorber devices 110 and 210 of FIGS. 1-4 is illustrated. The method 400 begins with step 402, forming a first generally tubular member 120 having a first end 122 and a second end 124. In step 404, a second generally tubular member 130 fitting within the first generally tubular member 120 is formed. The second generally tubular member 130 has a first end 132 and a second end 134. Each of the forming first generally tubular member 120 and second generally tubular member 130 in steps 402, 404 may be by seamless welding, extrusion, or roll forming with seam welding, but is not limited to such processes. Step 404 also can include forming additional generally tubular members for providing additional deformation stages as desired, such as for forming a third generally tubular member 240 for a multistage energy absorber device 210 to fit within a first generally tubular member 220 and a second generally tubular member 230. After the generally tubular members 120, 130 are formed, the method 400 moves to step 406, positioning the first ends 122, 132 of the first and second generally tubular members 120, 130 substantially flush with each other so that the second end 134 of the second generally tubular member 130 protrudes sufficiently beyond the second end 124 of the first generally tubular member 120 to form a first deformation stage 51. Also in step 406, the first and second generally tubular members 120, 130 are positioned so that the first generally tubular member 120 and the second generally tubular member 130 extend coextensively sufficiently from the first ends of the first and second generally tubular members 120, 130 to the second end 124 of the first tubular member 120 to form a second deformation stage S2. If additional generally tubular members such as a third generally tubular member 240 were formed in step 404, then step 406 includes positioning these additional generally tubular members.

Finally, in step 408, the multistage energy absorber device 110 or 210 is installed between two components that are attached or operatively adjacent to either end of the multistage energy absorber device 110 or 210. In FIG. 10, step 408 is illustrated with multistage energy absorber device 210 installed between the first vehicle component, bumper beam 308 (attached to the first component 250), and the second vehicle component, the frame rail 316 (attached to the second component 252). In FIG. 11, step 408 is illustrated with the multistage energy absorber device 210 installed between the first vehicle component, the instrument panel 352 (attached to the first component 250), and the second vehicle component, the knee bolster component 354 (attached to the second component 252). The multistage energy absorber device 210 is useful for other applications, including non-vehicle applications, in which controlled energy absorption if required.

Accordingly, the multistage energy absorber devices 110, 210 and the method 400 described herein provide manufacturing simplicity and ease of scaling of device (diameter, gage, length, shape) for multiple applications of the multistage energy absorber devices to control deformation of components resulting from an impact. Different thicknesses, etc. give different deformation rates. Additionally, by adding stages, desired deformation rates can be achieved for a variety of design criteria.

It is to be understood that the multistage energy absorber devices 110, 210 in FIGS. 1-4 are shown with exaggerated space between the generally tubular members to emphasize that each generally tubular member is independent. Design considerations may dictate that the generally tubular members fit very closely together in accordance with the present invention.

While the best modes for carrying out the invention have been described in detail, those familiar with the art to which this invention relates will recognize various alternative designs and embodiments for practicing the invention within the scope of the appended claims.

The invention claimed is:

1. A multistage energy absorber device comprising:
   a first generally tubular member having a first end and a second end;
   a second generally tubular member independent of the first generally tubular member and fitting within the first generally tubular member, the second generally tubular member having a first end and a second end;
   wherein the first ends of the first and second generally tubular members are substantially flush with each other;
   wherein the second end of the second generally tubular member protrudes sufficiently beyond the second end of the first generally tubular member to form a first deformation stage;
   wherein the first generally tubular member and the second generally tubular member extend coextensively sufficiently from the first ends of the first and second generally tubular members to the second end of the first generally tubular member to form a second deformation stage; and
   wherein the second end of the first generally tubular member is spot welded to the second generally tubular member.

2. The multistage energy absorber device of claim 1 wherein the second generally tubular member is steel having sufficient thickness to effect a first deformation rate for the first deformation stage.

3. The multistage energy absorber device of claim 2 wherein the first generally tubular member is steel having sufficient thickness to effect a second deformation rate for the second deformation stage.

4. The multistage energy absorber device of claim 1 further comprising:
   a first component attached to the second end of the second generally tubular member; and
   a second component attached to the first end of the first generally tubular member and the first end of the second generally tubular member; wherein a force applicable to the first component is applied in a direction toward the second component.

5. The multistage energy absorber device of claim 1 wherein each of the first generally tubular member and the second generally tubular member is a cylinder.

6. The multistage energy absorber device of claim 1 further including:
   a third generally tubular member independent of the first generally tubular member and the second generally tubular member and fitting within the second generally tubular member, the third generally tubular member having a first end and a second end;
   wherein the first ends of the first, second, and third generally tubular members are substantially flush with each other;
   wherein the second end of the third generally tubular member protrudes sufficiently beyond the second end of the second generally tubular member to form a third deformation stage;
   wherein the first, second and third generally tubular members extend coextensively sufficiently from the first ends of the first, second and third generally tubular members to the second end of the first generally tubular member to form the second deformation stage; and
   wherein the second and third generally tubular members extend coextensively sufficiently from the first ends of the second and third generally tubular members to the second end of the second generally tubular member to form the first deformation stage.

7. The multistage energy absorber device of claim 6 wherein the second end of the second generally tubular member is spot welded to the third generally tubular member and the second end of the first generally tubular member is spot welded to the second generally tubular member.

8. The multistage energy absorber device of claim 6 wherein the third generally tubular member is steel having sufficient thickness to effect a third deformation rate for the third deformation stage.

9. The multistage energy absorber device of claim 8 wherein the second generally tubular member is steel having sufficient thickness to effect a fourth deformation rate for the first deformation stage.

10. The multistage energy absorber device of claim 9 wherein the first generally tubular member is steel having sufficient thickness to effect a fifth deformation rate for the second deformation stage.

11. The multistage energy absorber device of claim 6 further comprising:
    a first component attached to the second end of the third generally tubular member; and
    a second component attached to the first end of the first generally tubular member, the first end of the second generally tubular member and the first end of the third generally tubular member; wherein a force applicable to the first component is applied in a direction toward the second component.

12. A vehicle comprising:
    a first generally tubular member having a first end and a second end;
    a second generally tubular member independent of the first generally tubular member and fitting within the first generally tubular member, the second generally tubular member having a first end and a second end;
    a third generally tubular member independent of the first generally tubular member and the second generally tubular member and fitting within the second generally tubular member, the third generally tubular member having a first end and a second end;
    wherein the first ends of the first, second, and third generally tubular members are substantially flush with each other;
    wherein the second end of the third generally tubular member protrudes sufficiently beyond the second end of the second generally tubular member to form a third deformation stage;
    wherein the first, second and third generally tubular members extend coextensively sufficiently from the first ends of the first, second and third generally tubular members to the second end of the first generally tubular member to form the second deformation stage;
    wherein the second and third generally tubular members extend coextensively sufficiently from the first ends of the second and third generally tubular members to the second end of the second generally tubular member to form the first deformation stage;
    a first component attached to the second end of the third generally tubular member;
    a second component attached to the first end of the first generally tubular member, the first end of the second generally tubular member and the first end of the third generally tubular member;

a first vehicle component on which the first component is mounted wherein the first vehicle component is one of a bumper beam and a vehicle instrument panel;

a second vehicle component on which the second component is mounted, wherein the second vehicle component is one of a frame rail and a knee bolster component; wherein a force applicable to the first vehicle component is applied in a direction toward the second vehicle component; and wherein the second end of the first generally tubular member is spot welded to the second Generally tubular member.

13. The vehicle of claim 12 wherein the first vehicle component is a bumper beam and the second vehicle component is a frame rail.

14. A method of forming a multistage energy absorber device comprising:

forming a first generally tubular member having a first end and a second end;

forming a second generally tubular member fitting within the first generally tubular member, the second generally tubular member having a first end and a second end;

positioning the first ends of the first and second generally tubular members substantially flush with each other so that the second end of the second generally tubular member protrudes sufficiently beyond the second end of the first generally tubular member to form a first deformation stage, and so that the first generally tubular member and the second generally tubular member extend coextensively sufficiently from the first ends of the first and second generally tubular members to the second end of the first generally tubular member to form a second deformation stage; and welding the second end of the first generally tubular member to the second generally tubular member.

15. The method of claim 14 further including:

attaching the second end of the second generally tubular member to a first component and the first ends of the first and second generally tubular members to a second component; wherein a force applicable to the first component is applied in a direction toward the second component.

16. The method of claim 14, further including:

forming a third generally tubular member fitting within the second generally tubular member; the third generally tubular member having a first end and a second end; and positioning the first ends of the first, second and third generally tubular members substantially flush with each other so that the second end of the third generally tubular member protrudes sufficiently beyond the second end of the second tubular member to form a third deformation stage.

17. The method of claim 16, further including:

attaching the second end of the third generally tubular member to a first component and the first ends of the first, second and third generally tubular members to a second component; wherein a force applicable to the first component is applied in a direction toward the second component.

* * * * *